No. 616,345. Patented Dec. 20, 1898.
W. F. NATSCHKE.
CULTIVATOR AND DRAFT EQUALIZER.
(Application filed June 14, 1897.)

(No Model.) 2 Sheets—Sheet 1.

Witnesses
Harry L. Amer.
Victor J. Evans.

Inventor
William F. Natschke.
by John Wedderburn
Attorney

THE NORRIS PETERS CO., PHOTO-LITHO., WASHINGTON, D. C.

No. 616,345. Patented Dec. 20, 1898.
W. F. NATSCHKE.
CULTIVATOR AND DRAFT EQUALIZER.
(Application filed June 14, 1897.)
(No Model.) 2 Sheets—Sheet 2.

Witnesses
Harry L. Amer.
Victor J. Evans

Inventor
William F. Natschke.
by John Wedderburn
Attorney

UNITED STATES PATENT OFFICE.

WILLIAM F. NATSCHKE, OF BUCKLEY, ILLINOIS.

CULTIVATOR AND DRAFT-EQUALIZER.

SPECIFICATION forming part of Letters Patent No. 616,345, dated December 20, 1898.

Application filed June 14, 1897. Serial No. 640,771. (No model.)

*To all whom it may concern:*

Be it known that I, WILLIAM F. NATSCHKE, of Buckley, in the county of Iroquois and State of Illinois, have invented certain new and useful Improvements in Cultivators; and I do hereby declare the following to be a full, clear, and exact description of the invention, such as will enable others skilled in the art to which it appertains to make and use the same.

This invention relates to improvements in cultivators, and has for its object to provide improved mechanism both for equalizing the draft-gear of the same as well as for adjusting the degree of engagement between the cultivators and the ground.

My improved device is of exceedingly simple mechanism having few operative parts and not at all liable to get out of order with ordinary use, and the draft-gear is so constructed as to permit the employment of four horses abreast, with means for directing the course of the cultivator in accordance with the direction given to the horses by the reins as ordinarily.

Figure 1:
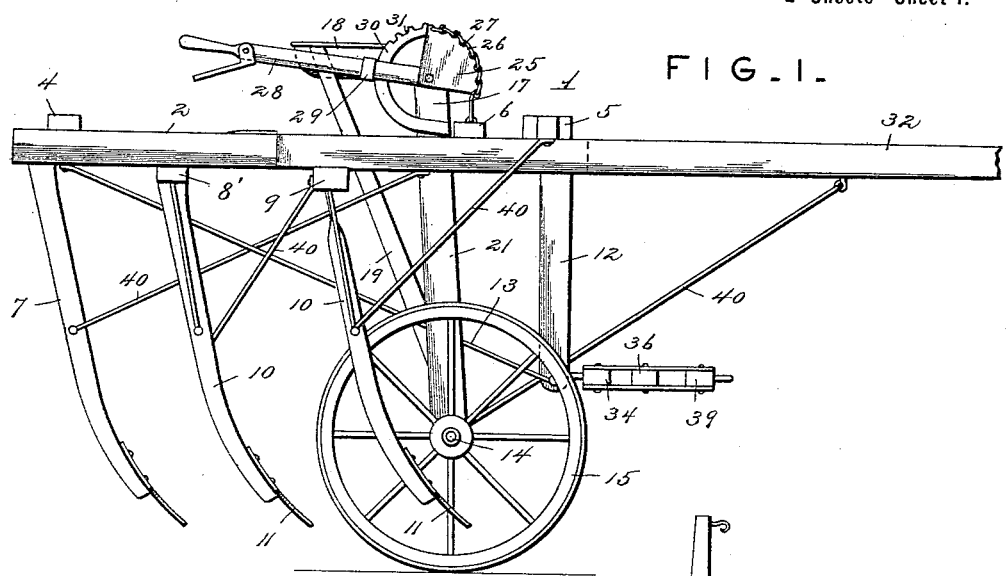
Figure 2:
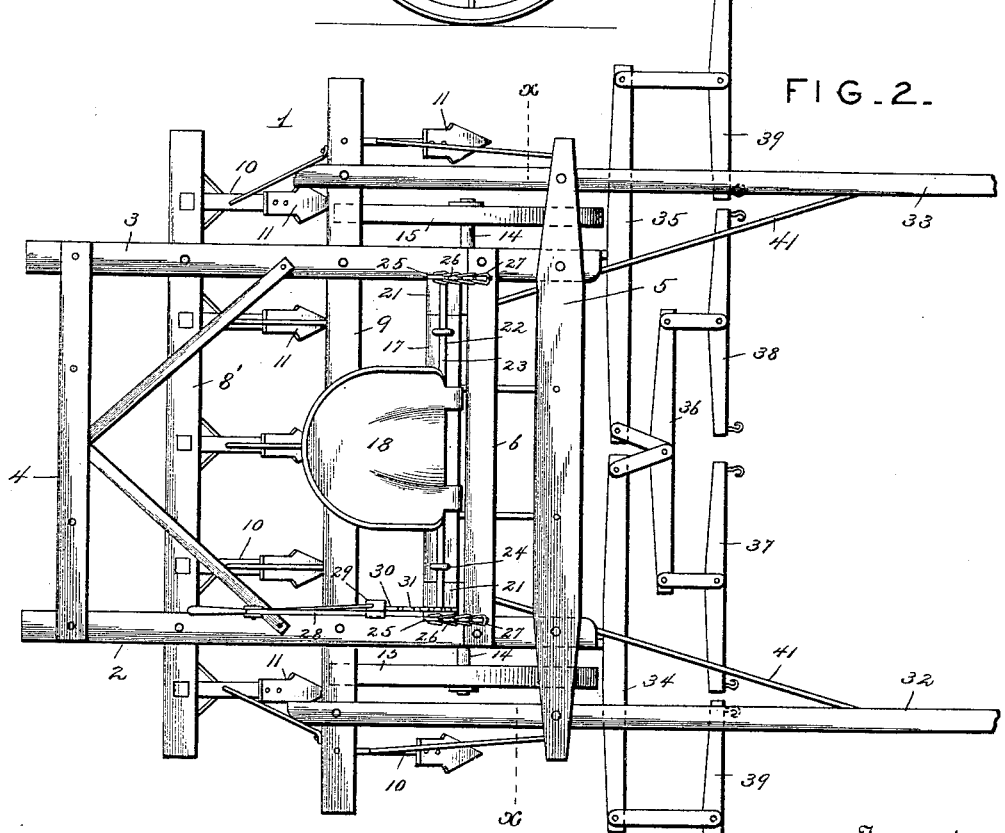
Figure 3:
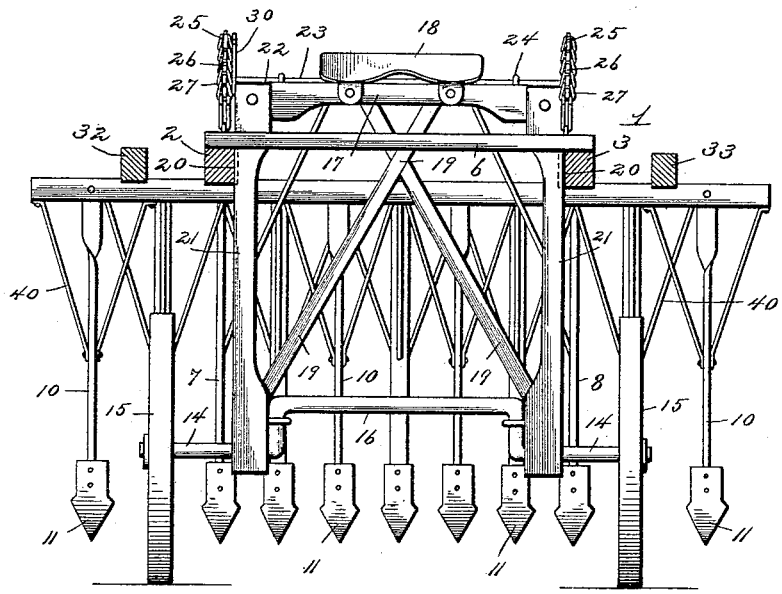
Figure 4:
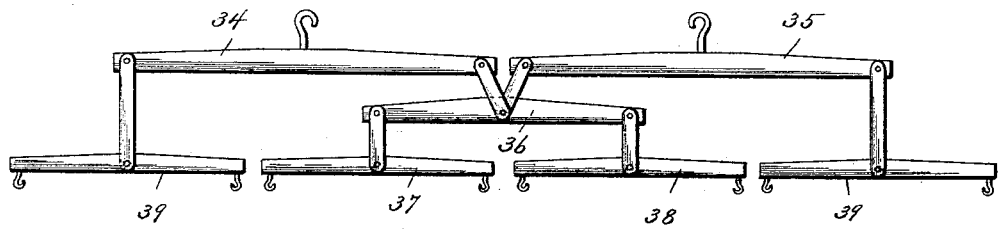

In the drawings herewith, Figure 1 is a side elevation of my improved cultivator, showing the frame thereof in a raised position. Fig. 2 is a top plan view. Fig. 3 is a transverse vertical section on line X X of Fig. 2. Fig. 4 is a plan view of the draft-gear used in connection with my improved cultivator.

In the construction of my improved cultivator I provide, first, a frame 1, consisting of longitudinal bars 2 and 3, having secured upon the upper surfaces thereof a rear cross-bar 4, a forward cross-bar, and a foot-bar 6. The said forward cross-bar 5 extends outwardly at either end beyond the frame 1 and is bolted to the two twin guiding-poles hereinafter referred to. Secured to the rear end of the two longitudinal bars 2 and 3 are two hangers 7 and 8, having cultivators secured upon their lower ends. Forwardly of these hangers are cross-bars 8' and 9, each bolted to the under sides of longitudinal bars 2 and 3 and each having secured thereto a plurality of hangers 10, each of said hangers provided at its lower end with a cultivator 11. The forward cross-bar 9 of the two last mentioned extends outwardly beyond the frame 1 and is provided upon each of its outer ends with a hanger and cultivator laterally beyond each of the wheels. The outer ends of said extended cross-bar 9 are bolted to the inner ends of the twin guide-poles hereinafter designated. Upon each of the forward ends of longitudinal bars 2 and 3 I secure hangers 12, adapted at their lower ends for attachment to the draft-gear. The lower ends of said hangers 12 are provided with backwardly-extended brace-rods 13, having their rear ends secured to the under surfaces of longitudinal bars 2 and 3, adjacent to the rear ends thereof.

I next provide an axle 14, with wheels 15, constituting the running-gear. Said axle is adjacent to each of its ends bent upwardly, so as to form an intermediate horizontal elevated portion 16. Upon the axle and rigidly secured thereto I construct a vertical frame 17, having fixed centrally upon its upper horizontal portion a seat or saddle 18, braced by intersecting rods or bars 19, extending from the inner surface of the vertical portions of the frame to the rear under side of said saddle, thus being secured thereby to the said frame. In the inner surface of each of the longitudinal bars 2 and 3 I form vertical slots 20, in which the vertical side portions 21 of the frame 17 are adapted to be retained against horizontal movement, but which will allow the said frame to move freely in an upward and downward direction. In the upper surface of the top or horizontal portion of said frame 17 I construct a longitudinal groove 22, extending throughout, and I further provide a shaft 23 of slightly greater length than that of said groove, so that the ends of said shaft will extend somewhat beyond the edges of the frame 17, said shaft being maintained within said groove by means of a plurality of keepers 24. I next provide upon each end of said shaft 23 a segmental plate 25, said plates being in rigid connection with said shaft, and upon the front edges of said plates I provide a plurality of sprocket-teeth 26. To the upper corner of each of said plates I secure a sprocket-chain 27 and secure the lower end of each of said sprocket-chains to the foot-board 6 or by means of a bolt extending through both said footboard 6 and the longitudinal bars 2 and 3. I next provide, rigidly secured to one of said segmental sprocketplates 25, an operating-lever 28, adapted by such connection to rotate said plate, the transverse shaft 23, and the other sprocket-plate upon the opposite end of said shaft. Upon said lever I provide a spring-pawl attachment 29, adapted to engage with the semicircular rack-bar 30, having the teeth or cogs 31 therein arranged differentially, this portion of my mechanism being provided for the purpose of lifting the frame 1.

In connection with the frame 1 I provide two forwardly-extended twin guide-poles 32 and 33, parallel with each other, each being, adjacent to its inner end, bolted to the under side of the forward bar 5 and at its outer end to the upper surface of the cross-bar. The poles 32 and 33 are placed sufficiently apart to permit the working of two horses abreast between them, and each of them is provided for attachment upon the outer end with breast-trees of the ordinary kind.

I next provide the draft-gear shown in plan view in Fig. 4, said gearing being adapted to permit the attachment of four horses working abreast of each other. Said gearing consists of two cross bars or trees 34 and 35, each having extended rearwardly at their longitudinal centers means for attachment to the lower ends of draft-hangers 12. Said draft bars or trees at each of their inner ends are provided with laterally-flexible links or fastenings concentrically secured upon the longitudinal center of a doubletree 36, at each end of which are flexibly secured singletrees 37 and 38. Each of the outer ends of said cross bars or trees 34 and 35 is provided with a singletree 39, flexibly secured thereto, the attachment being of sufficient length to bring each of said singletrees in alinement with those secured upon the doubletree 36. By means of this gearing, therefore, two horses are permitted to work abreast within the guide-poles 32 and 33 and two without said guide-poles, each of the guiding-poles being secured to a pair of horses, consisting of one within and one without said poles. By this means the steering of the cultivator is greatly facilitated.

The object in providing vertical adjustment for the frame 1 is to suit the cultivators to the character of soil and degree of engagement desired when in operation, and, further, to lift said cultivators entirely out of engagement whenever desired.

In addition to the parts of my device herein referred to I provide various brace-rods 40 in addition to the brace-rods 13. These additional brace-rods are constructed rigidly and are for the purpose of bracing portions of the frame 1 or the depending hangers 10, secured thereto. In addition to these brace-rods I provide two flexible forward braces 41, each adapted for attachment to the under surface of the guide-poles 32 and 33, their opposite ends being attached to the lower vertical side portions 21 of the frame 17. These flexible braces do not in any way interfere with the vertical movement of the frame 17.

Having thus described my invention, what I claim as new, and desire to secure by Letters Patent, is—

1. An apparatus substantially as described comprising the vertical frame having upright side bars, a top bar connecting the upper ends of same and an axle connecting the lower ends of said uprights, the horizontal frame sliding on said uprights of and arranged between the axle and top bar of the vertical frame, and means on the upright frame for adjusting the horizontal frame vertically substantially as set forth.

2. In an apparatus substantially as described the combination of the vertical frame having upright side bars and a top bar connecting the upper ends of said side bars, the horizontal frame having ways for said uprights and sliding thereon below the top bar, and means on the top bar whereby to adjust the horizontal frame vertically substantially as set forth.

3. In an apparatus substantially as described the combination of the vertical frame having uprights and a top cross-bar, the axle having an upwardly-bowed portion secured to the said uprights and the horizontal frame having ways for said uprights and slidable vertically upon the same substantially as set forth.

4. An apparatus substantially as described comprising the vertical frame having the uprights, the top bar connecting the same at their upper ends and the axle connecting the uprights at their lower ends, the horizontal frame sliding on said uprights between the axle and the top bar, the shaft on the top bar and having a lever and segment-plates and connections between the latter and the horizontal frame and detent mechanism substantially as set forth.

In testimony whereof I have signed this specification in the presence of two subscribing witnesses.

WILLIAM F. NATSCHKE.

Witnesses:
JOHN D. BAUMGARTNER,
H. H. HARLETT.